United States Patent
Sorensen (10) Patent No.: US 7,111,355 B1
(45) Date of Patent: Sep. 26, 2006

(54) DUAL MODE WINDSHIELD WIPER ASSEMBLY

(76) Inventor: Joe V. Sorensen, 2515 E. 3820 North, Twin Falls, ID (US) 83301

( * ) Notice: Subject to any disclaimer, the term of this patent is extended or adjusted under 35 U.S.C. 154(b) by 0 days.

(21) Appl. No.: 11/145,279

(22) Filed: Jun. 3, 2005

(51) Int. Cl.
*B60S 1/38* (2006.01)
*B60S 1/46* (2006.01)

(52) U.S. Cl. ............... 15/250.04; 15/250.4; 15/250.41
(58) Field of Classification Search ............ 15/250.04, 15/250.4, 250.41, 250.48, 250.01
See application file for complete search history.

(56) References Cited

U.S. PATENT DOCUMENTS

| 2,273,817 | A | * | 2/1942 | Chellew | ................ 15/250.352 |
| 3,874,019 | A | * | 4/1975 | Speth | ................... 15/250.32 |
| 4,628,565 | A | * | 12/1986 | Wolters | ................... 15/250.41 |
| 4,754,517 | A | | 7/1988 | Aldous | |
| 5,189,752 | A | | 3/1993 | Longacre et al. | |
| 5,442,834 | A | | 8/1995 | Perry | |
| D390,823 | S | | 2/1998 | Baranowski et al. | |
| 5,778,483 | A | * | 7/1998 | Dawson | ................... 15/250.04 |
| 5,799,359 | A | | 9/1998 | Dockery et al. | |
| 6,026,537 | A | | 2/2000 | Hojnacki | |
| 6,687,946 | B1 | * | 2/2004 | Reddoch | ................... 15/250.04 |

FOREIGN PATENT DOCUMENTS

| DE | 3934203 | * | 4/1991 |
| EP | 0020763 | * | 9/1982 |

* cited by examiner

Primary Examiner—Gary K. Graham
(74) Attorney, Agent, or Firm—Fulbright & Jaworski L.L.P.

(57) ABSTRACT

The present invention is directed to a windshield wiper assembly with an expandable scrubbing element capable of washing debris from a windshield. In one embodiment, the subject invention is comprised of a windshield wiper blade holder having a first and second blade retainer, and a scrubbing element and wiper blade respectively engaged to the blade retainers. In one embodiment, the scrubbing element is comprised of a spine portion and an expandable bladder depending therefrom. At least a portion of the external surface of the bladder may include a fibrous or lightly abrasive material, or a scrubbing pad or brush-like surface, or a plurality of grooves and/or sipings The interior volume of the bladder is surrounded by a resilient fluid tight material, which serves to retain fluid in a pressurized state.

21 Claims, 7 Drawing Sheets

DUAL MODE WINDSHIELD WIPER ASSEMBLY

FIELD OF THE INVENTION

This invention relates generally to an apparatus for wiping and cleaning the windshield of a vehicle. More specifically, the invention relates to an assembly which is attached to the windshield wiper arm of a vehicle and is capable of selectively operating in cleaning and wiping modes.

BACKGROUND OF THE INVENTION

The windshield of a car, truck, boat, aircraft and other vehicles will often get dirty and/or wet, thereby occluding the driver's vision. Consequently, most vehicles are equipped with a windshield wiper to clear the windshield of water and dirt. However, some matter, such as dried insects, mud, and bird droppings, partially adheres to the windshield and is often difficult to remove. Known windshield wiper assemblies are poorly equipped to clear difficult matter from the windshield. In some situations, known windshield wiper assemblies may even exacerbate the situation by smearing this matter across the windshield. Consequently, there is a need for a windshield wiper assembly that is capable of effectively cleaning such matter from the windshield. A further need exists for such a wiper assembly which is selectively actuated by a vehicle operator to perform the cleaning function.

Conventional windshield wiper assemblies typically include a windshield wiper arm that extends from a windshield wiper motor located in the vehicle. A windshield wiper blade holder engages the windshield wiper arm and is moved generally circumferentially back and forth by the arm. A wiper blade engages the blade holder along its spine and contacts the windshield along its tip. It is the movement of the wiper blade tip across the windshield which wipes the windshield of excess moisture. Many vehicles also have a pressurized fluid delivery system which sprays cleaning fluid onto the windshield. Such pressurized fluid systems are selectively actuated either manually by the vehicle operator or automatically by, for example, an electronic control system.

Most windshield wiper blades are long, flexible strips of rubber or plastic. The blades are typically comprised of a spine portion which engages the wiper blade holder and a tip portion which depends therefrom. This tip portion contacts the windshield and wipes excess water along its path. However, the tip is often too flimsy to generate sufficient forces to effectively scrape off dried matter adhered to the windshield. Furthermore, the small area of contact between the tip and the windshield may promote smearing of some matter.

Consequently, there is a need in the art for an improved windshield wiper assembly. This improved assembly should be capable of washing matter off of the windshield while also being capable of removing excess fluid buildup like conventional windshield wiper assemblies. Furthermore, this improved assembly should be capable of being adapted for use with current windshield wiper assemblies. As will be shown in detail below, the subject invention improves upon the known prior art and solves many of the problems related to known designs.

SUMMARY OF THE INVENTION

The present invention is directed to a dual mode, selective windshield wiper assembly with a conventional wiper blade and an expandable scrubbing element capable of washing debris from a windshield. In one embodiment, the subject invention is comprised of a windshield wiper blade holder having a first and second blade retainer, and a scrubbing element and wiper blade respectively engaged to the blade retainers.

In one embodiment, the blade holder has two wiper blade retainers mounted generally parallel to one another. The blade holder typically includes a central arm and a pair of primary levers (one for each blade retainer) located along each longitudinal end. The primary levers are pivotally coupled to the central arm at a fulcrum. A secondary lever is pivotally coupled at a fulcrum to a longitudinal end of the primary lever. One or more secondary levers can be coupled to each primary lever. The secondary levers also couple to a blade retainer along each longitudinal end.

In one embodiment, the blade retainer is comprised of a longitudinally extending strut. The strut typically includes a longitudinally extending flange surface which is complementary to an engaging surface on a wiper blade.

In one embodiment, the wiper blade is an elongated flexible strip which consists of a spine portion that is adapted to engage the blade retainer, and a tip section that contacts the windshield. The tip section squeegees the windshield as the blade holder is moved back and forth by the windshield wiper arm.

In one embodiment, the scrubbing element is comprised of a spine portion and an expandable bladder depending therefrom. The spine portion engages the blade retainer and positions the bladder so that it depends from the blade holder. In one embodiment, the bladder defines an external surface and an interior volume. At least a portion of the external surface of the bladder preferably includes a fibrous or lightly abrasive material, or includes a scrubbing pad or brush-like surface. The interior volume of the bladder is preferably surrounded by a resilient, waterproof and/or fluid tight material which serves to retain fluid in a pressurized state. The pressurized fluid may be a positively pressurized liquid, such as cleaning solution pressurized by an external pump, or may be positively or negatively pressurized air from an air source, such as an external air pump or a vacuum pump. In disclosed embodiments of the present invention, a single fluid line extends from the bladder and communicates with a pressurized fluid source. In alternative embodiments, multiple fluid lines may be provided to supply the fluid.

In operation, one embodiment of the subject invention is operated by activating the wash function on an automobile's wiper system. The wash function communicates a pressurized stream of cleaning fluid from the automobile's cleaning fluid source through the line and into the interior volume of the scrubbing element. This pressurized cleaning fluid can be emitted from apertures of the scrubbing element or through an external nozzle or both for contact with the windshield. One function of the pressurized fluid is to cause the bladder of the scrubbing element to expand, enabling the external surface of the scrubbing element to contact the surface of the windshield wiper. Concurrently, the wiper blade is temporarily raised away from the windshield.

In another embodiment of the present invention, the pressurized fluid is air provided at positive or negative pressures in order to inflate and deflate the bladder. One benefit of an application utilizing a vacuum air supply is a relatively quick deflation of the bladder.

Once the soil or dried matter is removed from the windshield, the wash function can be deactivated, thereby stopping the flow of fluid into the scrubbing element. A resilient force within the scrubbing element causes it to deflate and lose contact with the windshield. Alternatively, a vacuum may be applied to expedite deflation of the scrubbing element bladder. Concurrently, the wiper blade is lowered onto the windshield, enabling it to remove excess fluid from the surface in normal fashion.

BRIEF DESCRIPTION OF THE DRAWINGS AND FIGURES

For purposes of facilitating and understanding the subject matter sought to be protected, there is illustrated in the accompanying drawings an embodiment thereof. From an inspection of the drawings, when considered in connection with the following description, the subject matter sought to be protected, its construction and operation, and many of its advantages should be readily understood and appreciated.

DETAILED DESCRIPTION OF THE PREFERRED EMBODIMENTS

The present invention is directed to a windshield wiper assembly with an expandable scrubbing element capable of washing debris from a windshield. For the purposes of explanation only, the subject invention will be described further as applied to a windshield wiper assembly adapted for use in an automobile or truck. One skilled in the art can readily comprehend that the subject invention can be easily applied to a variety of different vehicles or to an automated window washing apparatus.

Figure 1:
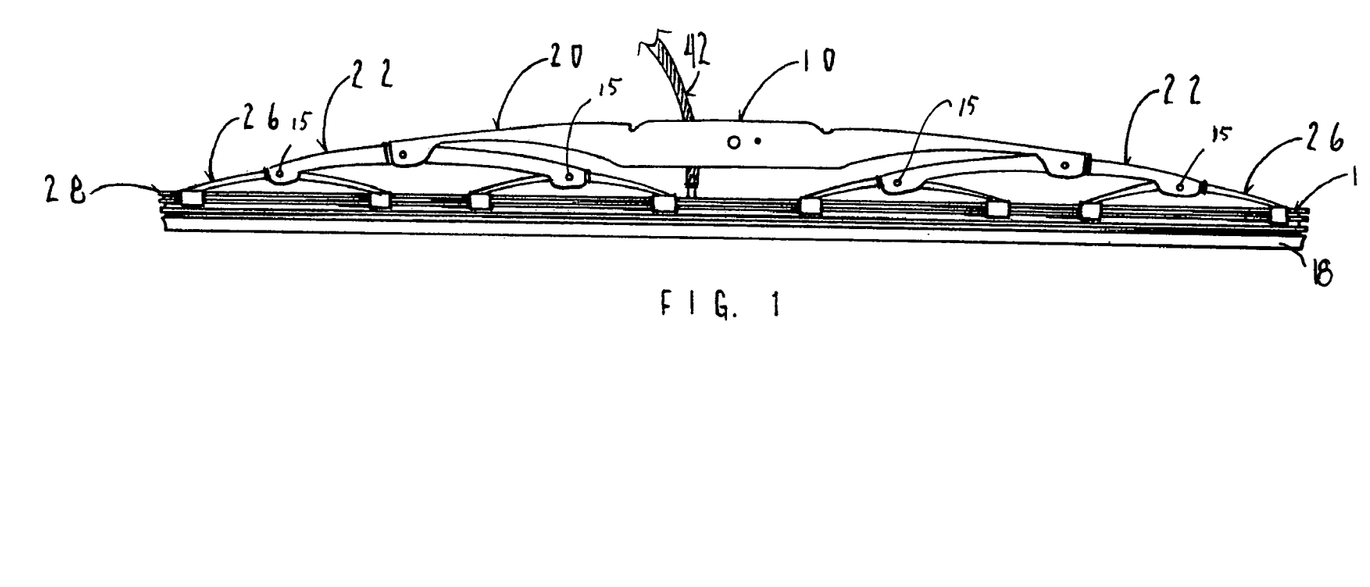
FIG. 1 is a side view of one embodiment of the subject invention.
Figure 2:
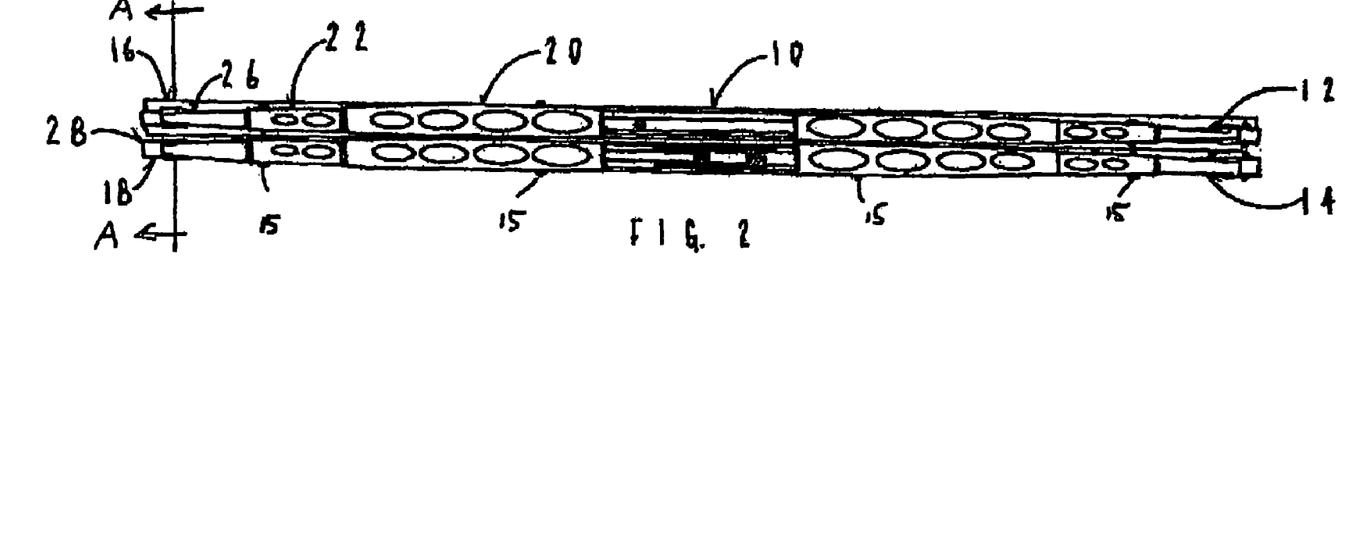
FIG. 2 is an overhead view of the embodiment of FIG. 1.

As shown in FIGS. 1 and 2, in one embodiment, the subject invention is comprised of a windshield wiper blade holder 10 having first and second blade retainers 12 and 14, and a scrubbing element 16 and wiper blade 18 respectively engaged to the blade retainers 12 and 14. The windshield wiper blade holder 10 is adapted to attach to a wiper arm of an automobile or truck and is mounted thereto so that the scrubbing element 16 and wiper blades 18 confront the windshield.

The blade holder 10 can be any blade holder known in the art. Many different configurations of a blade holder can be utilized with the present invention. As shown in FIGS. 1 and 2, in one embodiment, the blade holder is a twin blade holder having two wiper blade retainers 12 and 14 mounted parallel to each other and connected by a plurality of pin elements 15. The blade holder 10 typically includes a central arm 20 and a pair of primary levers 22 (one for each blade retainer) located along each longitudinal end. The primary levers 22 are pivotally coupled to the central arm 20 at a fulcrum. A secondary lever 26 is pivotally coupled at a fulcrum to a longitudinal end of the primary lever 22. One or more secondary levers 26 can be coupled to each primary lever. The secondary levers also couple to a blade retainer 12 and 14 along each longitudinal end. This network of levers enables the blade retainer to conform to the contour of the windshield.

The blade retainers 12 and 14 can be any which are known in the art. Many different configurations can also be adapted for use with the present invention. In one embodiment, the blade retainer is comprised of a longitudinally extending strut 28. The strut 28 typically includes a longitudinally extending flange surface which is complementary to an engaging surface on a wiper blade. Typically, the blade retainers 12 and 14 slidably engage the wiper blade and the scrubbing element 16. Also, the blade retainers 12 and 14 are generally flexible in order to allow the wiper blade to conform to the contour of the window.

As shown in FIGS. 1 through 5, in one embodiment the present invention includes an expandable scrubbing element 16 coupled to the first blade retainer 12, and a wiper blade 18 coupled to the second blade retainer 14. The wiper blade 18 can be of any design which is known in the art. Typically, the wiper blade 18 is an elongated flexible strip which consists of a spine portion that is adapted to engage the blade retainer 14 and a tip section that contacts the windshield. The tip section squeegees the windshield as the blade holder 10 is moved back and forth by the windshield wiper arm.

In one embodiment, an expandable scrubbing element 16 is coupled to the first blade retainer 12. The scrubbing element 16 is typically comprised of a spine portion 30 and an expandable bladder 32 depending therefrom. The spine portion 30 engages the blade retainer 12 and positions the bladder 32 so that it depends from the blade holder 10.

Figure 6:
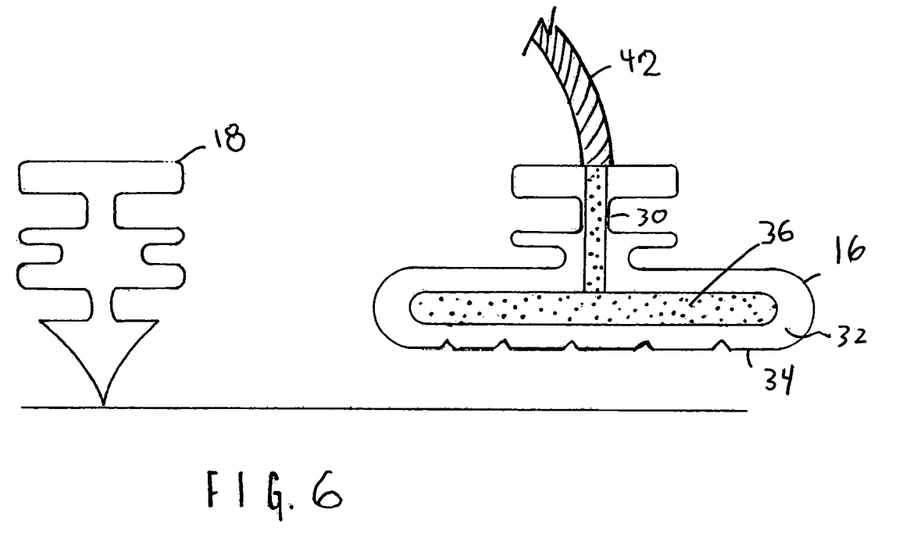
FIGS. 6 and 7 are cross-sectional views of alternative scrubbing elements of embodiments of the present invention.
Figure 7:
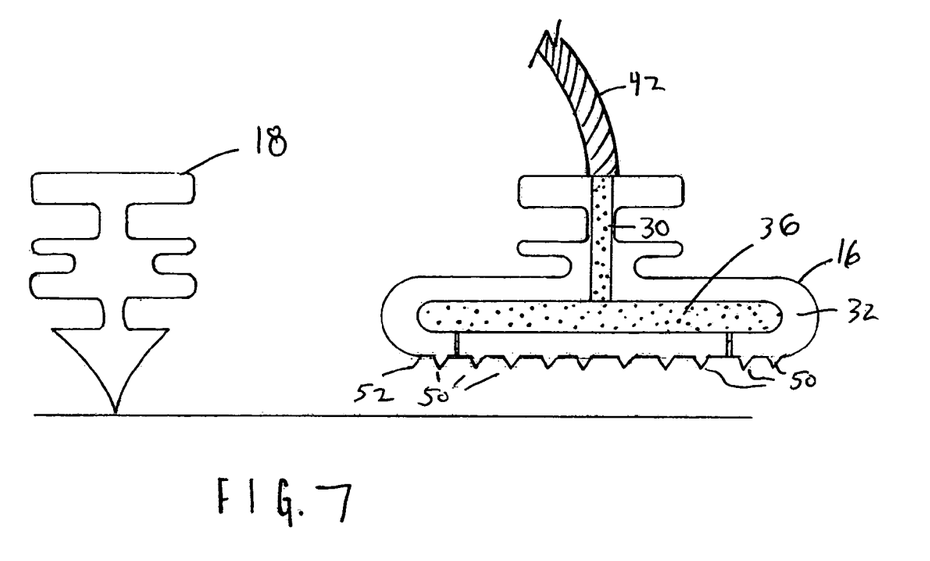

In one embodiment, the bladder 32 defines an external surface 34 and an interior volume 36. In one embodiment of the present invention, at least a portion of the external surface 34 of the bladder 32 includes a scrubbing material such as a fibrous or lightly abrasive material, or a scrubbing pad or a brush-like surface. In other embodiments, external surface 34 may be defined by sipings or grooves cut or molded into the outer surface of bladder 32. Such sipings or grooves may include longitudinally or transversely extending elements. The sipings or grooves may be formed during a post-extrusion process. Those of ordinary skill in the arts will appreciate a variety of different approaches to defining grooves or sipings upon a surface of scrubbing element 16. For example, FIG. 6 illustrates a cross sectional view of scrubbing element 16 having a plurality of grooves cut into the bladder 32. FIG. 7 illustrates another scrubbing element 16 having a plurality of protruding elements 50 extending away from a lower surface 52 of scrubbing element 16. A scrubbing surface 38 may thus include a separate material connected to scrubbing element 16 or may be integrally formed therewithin. When expanded, a portion of the external surface 34 is in direct contact with the windshield, forming the scrubbing surface 38, 34, 50. This scrubbing surface 38, 34, 50 extends longitudinally along the scrubbing element 16.

In one embodiment, the interior volume 36 of the bladder is surrounded by a resilient waterproof material which serves to retain fluid in a pressurized state. The flow of fluid into this interior volume causes the scrubbing element to expand. A plurality of apertures 40 extends from the interior volume to the external surface to enable cleaning fluid to exit from the bladder onto the windshield. A fluid line 42 (FIG. 2) couples the interior volume 36 to the cleaning fluid dispenser of an automobile. In an alternative embodiment, the bladder is comprised of a fabric.

Figure 3:
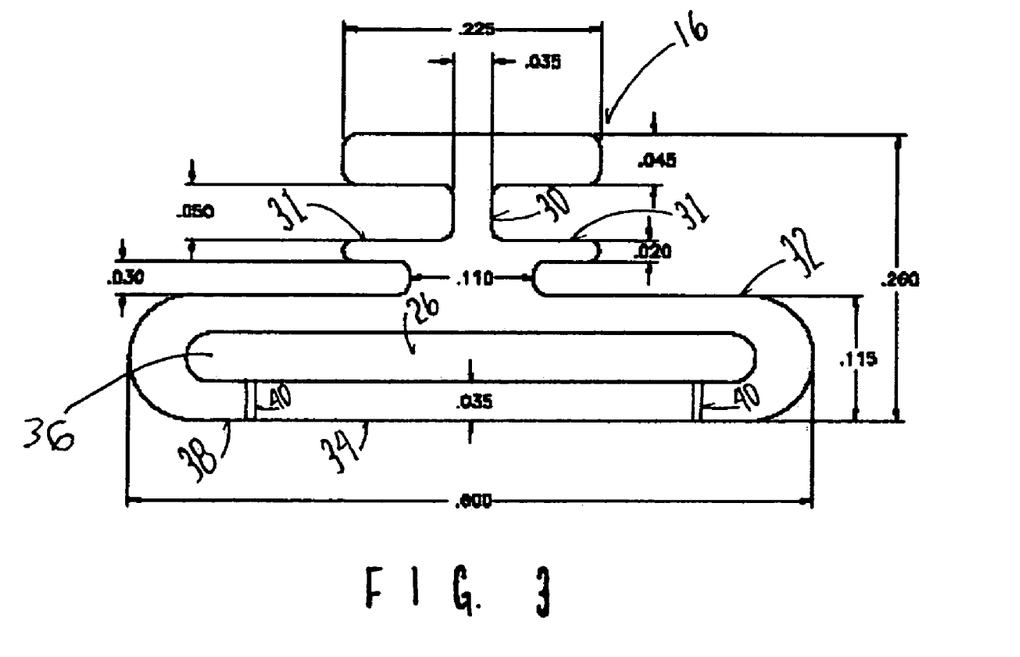
FIG. 3 is a cross-sectional view of one embodiment of a scrubbing element.
Figure 4:
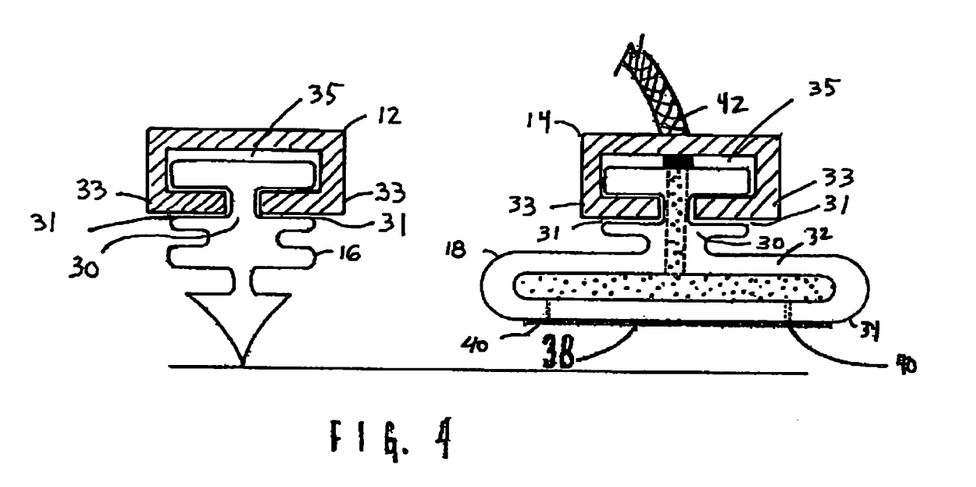
FIG. 4 is a partial cross-sectional view of the embodiment of FIG. 1, taken along lines A—A with the scrubbing element in a deflated state.
Figure 5:
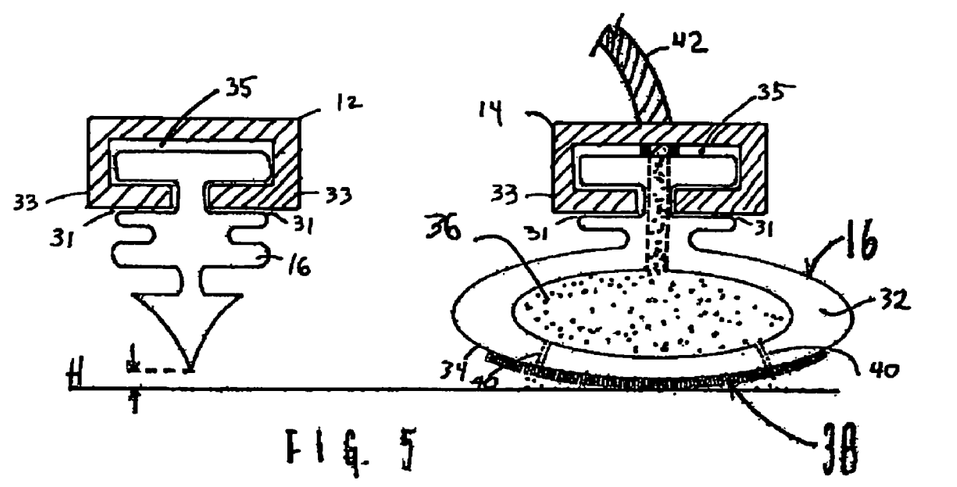
FIG. 5 is a partial cross-sectional view of the embodiment of FIG. 1, taken along lines A—A with the scrubbing element in an inflated state.

As shown in FIGS. 3–5, in one embodiment, the scrubbing element includes a spine 30 which includes opposing elongated grooves 31 for slidably the inwardly directed arms 33 at channel 35 on a blade retainer 12, 14. When fully expanded, the subbing element increases in height H by roughly 0.02 inch. This enables roughly 0.4 inch of cross sectional, external surface 34 area to contact the windshield. The spine portion 30 is adapted to slidably engage a common configuration for wiper blade holders.

As shown in FIGS. 4 and 5, in operation, one embodiment of the subject invention is activated by selecting the wash function on an automobile's wiper system. The wash function activates a fluid pump in an automobile which sends a pressurized stream of cleaning fluid from the automobile's cleaning fluid dispenser to the hydraulic line 42 and then into the interior volume 36 of the scrubbing element 16. The pressurized fluid causes the scrubbing element 16 to expand, increasing the height H of the bladder 32 and enabling the external surface 34 of the scrubbing element 16 to contact the surface of the windshield. Concurrently, the increased height H of the scrubbing element lifts the wiper blade 18 from the windshield. Fluid is simultaneously released through the aperture 40. Apertures 40 are optional, and in another embodiment of the present invention, bladder 32 defines a substantially closed interior volume capable of receiving liquid or air to inflate and deflate bladder 32.

As the subject invention moves back and forth across the windshield, the external surface 34 of the scrubbing element 16 scrubs the surface of the windshield. Once expanded, the scrubbing element 16 has a significantly larger amount of surface area 34 in contact with the windshield than a normal wiper blade. Furthermore, the scrubbing element 16 is able to effectively remove difficult matter such as bird droppings, mud, or dead insects from most windshields.

In contrast, current wiper blades have a small amount of surface area in contact with the windshield (the tip), and because of their flexibility, most wiper blades are able to apply significantly less pressure to the surface of the windshield. As such, most wiper blades are only able to squeegee the surface of a windshield.

Once the matter is removed from the windshield, the wash function is deactivated, thereby stopping the flow of fluid into the scrubbing element 16. A resilient force within the scrubbing element causes it to deflate and lose contact with the windshield. Concurrently, the decrease in height H lowers the wiper blade 18 onto the windshield, enabling it to contact the windshield. In an alternative embodiment, a vacuum source (such as engine vacuum) may be utilized to deflate the scrubbing element bladder. For example, a vacuum may be selectively applied to the scrubbing element to expedite the deflation of the scrubbing element.

A variety of different control strategies may be utilized to practice the present invention. For example, a simple manual switch may be utilized to selectively direct pressurized cleaning solution into the scrubbing element bladder. In another embodiment, an electronic control device may be used to control activation and deactivation of the scrubbing element. For example, an electronic controller including a timer function may be utilized to activate the scrubbing element for a predetermined period of time, such as 15 seconds.

The matter set forth in the foregoing description and accompanying drawings is offered by way of illustration only, and not as a limitation. While a particular embodiment has been shown and described, it will be obvious to those skilled in the art that changes and modifications may be made without departing from the broader aspects of applicant's contribution. The actual scope of the protection sought is intended to be defined in the following claims when viewed in their proper perspective based on the prior art.

The invention claimed is:

1. A windshield wiper blade assembly comprising:
a blade holder having a pair of blade retainers, each blade retainer being pivotally connected relative to a central portion of the blade holder, each blade retainer defining an open channel having a pair of inwardly directed arms;
a wiper having a generally T-shaped sine and a blade portion extending from the spine, said wiper being connected to one of the pair of blade retainers with portions of the T-shaped spine slidably engaging the pair of inwardly directed arms of the blade retainer so as to retain the wiper;
a scrubbing element having a generally T-shaped spine and a bladder depending from the spine, wherein the spine is adapted to slidably engage the pair of inwardly directed arms of the other blade retainer; and
a fluid line in communication with the bladder.

2. The assembly of claim 1, wherein the fluid line communicates liquid or air to the bladder to expand or deflate the bladder.

3. The assembly of claim 1, wherein the bladder has an exterior surface that is at least partially covered by a scrubbing material.

4. The assembly of claim 3, wherein the bladder defines an interior surface and wherein the interior surface is comprised of a fluid-tight material.

5. The assembly of claim 4, wherein a plurality of at extend from the interior surface to the exterior surface.

6. The assembly of claim 1, wherein the bladder is made of a resilient material.

7. The assembly of claim 1, wherein the bladder has a generally oval cross-section.

8. The assembly of claim 1, wherein the fluid line is adapted along one end to fluidly couple to a cleaning fluid deliver system of a vehicle.

9. A windshield wiper assembly comprising:
a blade holder having a first and second blade retainers, each blade retainer being at an outer end of a secondary lever which is pivotally connected to a primary lever which is pivotally connected to a central portion of the blade holder, wherein each blade retainer is capable of moving independently relative to the other blade retainer;
a scrubbing element hang a first spine and a bladder depending from the spine, wherein the first spine is adapted to slidably engage the first blade retainer and to locate the bladder so that the bladder depends from the blade holder;
a blade having a second spine and a tip portion depending from the second spine, wherein the second spine is adapted to engage the second blade retainer, whereby portions of the scrubbing element and the blade are independently movable relative to each other; and
a fluid line in communication with the bladder.

10. The blade assembly of claim 9, wherein the first and second blade retainers are generally parallel to each other.

11. The blade assembly of claim 9, wherein the blade holder is adapted to engage a windshield wiper arm of an automobile.

12. The blade assembly of claim 9, wherein the fluid line is adapted to fluidly couple to a cleaning fluid delivery system of an automobile.

13. The blade assembly of claim 9, wherein the bladder is capable of expanding to at least 0.02 inch in height.

14. The blade assembly of claim 9, wherein the bladder is adapted to expand when pressurized and to retract when non-pressurized.

15. The blade assembly of claim 9, and further comprising a pressurized fluid source fluidly coupled to the fluid line, and wherein the fluid source is pressurized air or liquid.

16. A windshield wiper assembly comprising:
    a first spine having a longitudinal length and being slidably connected to a first blade retainer;
    an expandable scrubbing element depending from the first spine along its longitudinal length;
    a second spine being slidably connected to a second blade retainer;
    means for pivotally connecting the first blade retainer to a central arm portion of a blade holder;
    means for pivotally connecting the second blade retainer to the central arm portion, whereby the first and second blade retainers are independently movable relative to each other; and
    a fluid line in communication with the scrubbing element.

17. The blade of claim 16, wherein the scrubbing element defines an interior surface, and wherein the interior surface is at least partially made of a resilient fluid-tight material.

18. The blade of claim 17, wherein the first spine locates the scrubbing element so that it depends from the windshield wiper blade holder.

19. The blade of claim 18, wherein the fluid line includes a connector for fluidly coupling the scrubbing element to an automobile cleaning fluid delivery system.

20. The blade of claim 19, wherein the scrubbing element expands to at least 0.02 inch in height when a source of pressurized liquid is applied.

21. The blade of claim 20, wherein the scrubbing element has a generally oval cross-section.

\* \* \* \* \*

UNITED STATES PATENT AND TRADEMARK OFFICE
CERTIFICATE OF CORRECTION

PATENT NO.        : 7,111,355 B1                                              Page 1 of 1
APPLICATION NO. : 11/145279
DATED             : September 26, 2006
INVENTOR(S)       : Joe V. Sorensen It is certified that error appears in the above-identified patent and that said Letters Patent is hereby corrected as shown below:

Col. 6 in claim 5, line 1, "at" should read --apertures--.
Col. 6 in claim 8, line 3, "deliver" should read --delivery--.
Col. 6 in claim 9, line 9, "hang" should read --having--.

Signed and Sealed this

Nineteenth Day of December, 2006

JON W. DUDAS
*Director of the United States Patent and Trademark Office*